April 2, 1940.  C. P. SAUPP, JR  2,195,940
SAFETY GROUND SWITCH
Filed Feb. 17, 1938
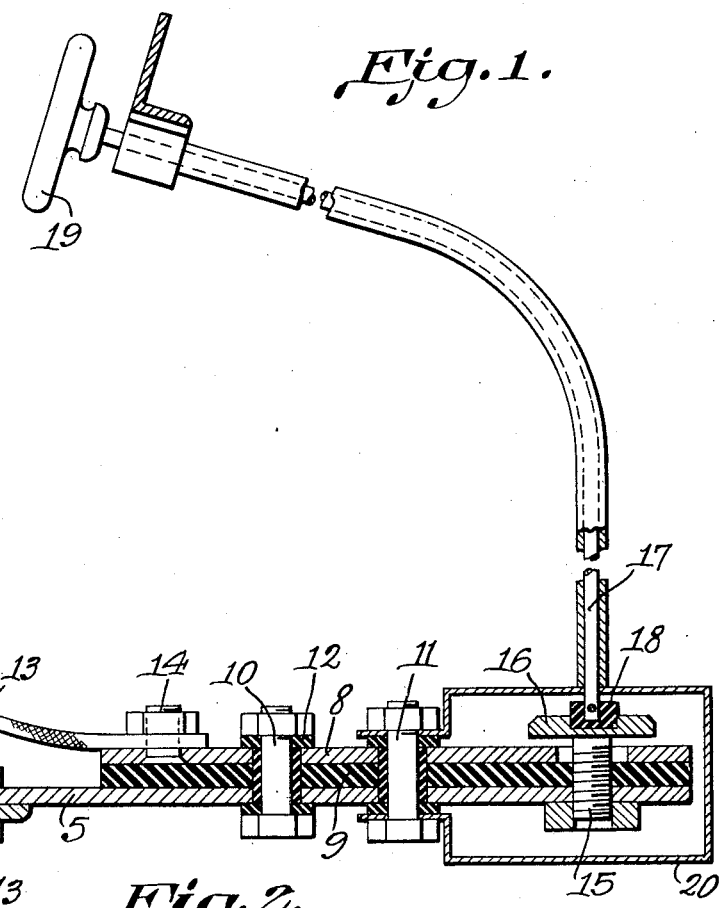
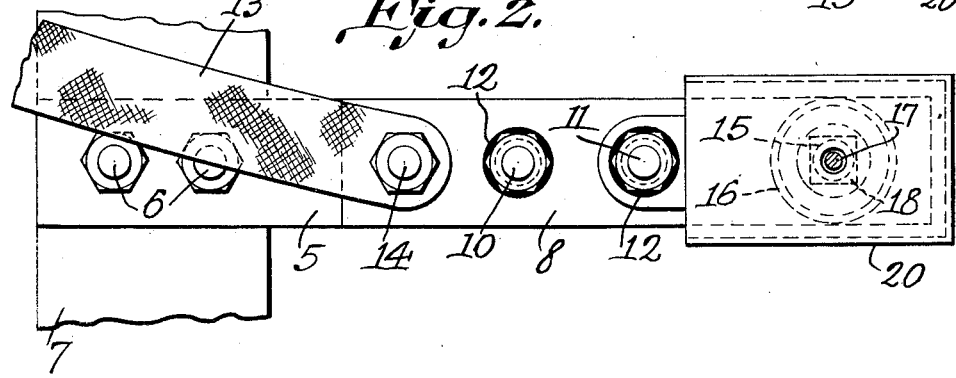
Chauncey P. Saupp, Jr.
INVENTOR.
BY
ATTORNEYS.

Patented Apr. 2, 1940

2,195,940

UNITED STATES PATENT OFFICE 2,195,940

SAFETY GROUND SWITCH

Chauncey P. Saupp, Jr., Houtzdale, Pa.

Application February 17, 1938, Serial No. 191,090

1 Claim. (Cl. 200—161)

This invention relates to a device for use in connection with motor vehicles, motor boats or the like, the primary object of the invention being to provide means whereby the usual battery used in supplying the electric energy necessary for the operation of motor vehicles or motor boats, may be readily and conveniently disconnected, from the various circuits, thereby eliminating all danger of fire, caused by a short circuit.

An important object of the invention is to provide a device of this character which may be readily and easily connected in the usual ground circuit of the battery, eliminating the necessity of making alterations in the construction of the battery or vehicle, to install the attachment.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is a sectional view through a device constructed in accordance with the invention.

Figure 2 is a plan view thereof.

Referring to the drawing in detail, the attachment embodies a main or supporting bar 5, constructed of conductive material, the bar having openings for the reception of the bolts 6, whereby the device may be secured to the rail 7 of the chassis of the vehicle, and to which the usual battery of a motor vehicle is grounded.

The reference character 8 designates a contact bar, which is also constructed of conductive material and insulated from the bar 5, by means of the insulating member 9 which is shown as positioned between the bars 5 and 8. Bolts 10 and 11, pass through the bars 5, and 8, and member 9, securing the bars 5, 8 and member 9 together, the bolts 10 and 11 being insulated from the bars 5 and 8 by the insulating material 12. The ground strap is indicated by the reference character 13 and is bolted to the bar 8 by means of the bolt 14, the opposite end of the strap 13 being secured to a battery post of the battery with which the device is used, and which is not shown in the present drawing.

Registering openings are formed in the bars 5, and 8 and insulating member 9, for the reception of the threaded stem 15 of the movable switch member. As shown, the stem 15 is of a diameter to contact with the bar 5, but at the same time be permitted to move through the registering openings, to accomplish the purpose of the invention. Secured to the upper end of the stem 15, is a contact member 16 adapted to move into engagement with the bar 8, completing the circuit through the bar 8, contact member 16, bar 5 and rail 7.

The operating cable is indicated by the reference character 17 and is connected to the contact member 16, through the contact member 18 which is shown as seated in a recess formed in the contact member 16. As illustrated by Figure 1 of the drawing, the cable 17, is of a length to extend to the instrument board of the vehicle, where it is supplied with the knob 19 for easy and positive operation of the cable to move the switch member 16 into and out of operation, controlling the ground of the battery.

In order that the switch member 16 and contact surfaces of the bars 5 and 8 will be protected against the elements, a housing 20 is provided, completely enclosing the contact member 16 and contact surfaces of the bars 5 and 8.

From the foregoing it will be seen that due to the construction shown and described, the ground circuit may be readily broken, entirely disconnecting the battery from the various wires providing the circuits of the motor vehicle, and eliminating any possibility of fire by short circuit.

I claim:

A switch for use in the ground circuit of the battery of a motor vehicle, comprising upper and lower contact bars, insulating material between the bars, said bars and insulating material having aligning openings, one of said bars adapted to be secured to a rail of the chassis of the vehicle, a battery ground strap leading from the battery and secured to the other bar, a switch embodying a stem and a contact member on the stem, said stem being movable through the aligning openings and permanently contacting with the lower bar, the opening in the upper bar being of a diameter greater than the diameter of the stem of the switch, providing a space between the stem and upper bar, said switch member adapted to engage the upper bar completing the ground circuit to the battery between the stem and bars when the switch is moved in one direction, and means for operating the switch to break or complete the circuit through the switch.

CHAUNCEY P. SAUPP, Jr.